(12) United States Patent
Gasquet

(10) Patent No.: US 7,083,746 B2
(45) Date of Patent: Aug. 1, 2006

(54) METHOD OF MAKING AN OPTICAL COMPONENT, A MOULD FOR USE IN SUCH METHOD, AND AN OPTICAL COMPONENT SO PRODUCED

(75) Inventor: Jean Claude Gasquet, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 446 days.

(21) Appl. No.: 10/154,103

(22) Filed: May 22, 2002

(65) Prior Publication Data
US 2002/0175429 A1 Nov. 28, 2002

(30) Foreign Application Priority Data
May 28, 2001 (FR) .................................. 01 07109

(51) Int. Cl.
*B29D 11/00* (2006.01)
(52) U.S. Cl. ................. 264/1.36; 219/69.12; 264/1.37; 264/2.5; 425/174; 425/175; 425/808
(58) Field of Classification Search ................. 264/1.1, 264/2.5, 1.36, 1.37; 425/174.4, 175, 808, 425/174.6, 174.8 R; 219/69.11, 69.12
See application file for complete search history.

(56) References Cited

U.S. PATENT DOCUMENTS
4,948,537 A 8/1990 Ohkoshi et al. ............. 264/2.5

FOREIGN PATENT DOCUMENTS
EP 0 944 056 A1 5/1998
JP 56-17229 2/1981

OTHER PUBLICATIONS
French Search Report, Feb. 27, 2002.

*Primary Examiner*—Mathieu D. Vargot
(74) *Attorney, Agent, or Firm*—Morgan & Finnegan LLP

(57) ABSTRACT

An optical component has working surfaces separated by neutral surfaces which constitute discontinuities between the working surfaces. The component is made by a method which comprises: forming, in a mould, surfaces complementary to the working and neutral surfaces of the component; and moulding the component on these surfaces of the mould.

The step of forming the complementary surfaces in the mould is carried out by continuous cutting of a block of material using a cutting tool.

14 Claims, 4 Drawing Sheets

METHOD OF MAKING AN OPTICAL COMPONENT, A MOULD FOR USE IN SUCH METHOD, AND AN OPTICAL COMPONENT SO PRODUCED

FIELD OF THE INVENTION

The present invention relates to optical components in general, and more particularly to such components which have discontinuous surfaces. Examples include lenses or Fresnel prisms, or sawtooth prisms. The invention also relates to a method of making such optical components, and a mould for use in such a method.

BACKGROUND OF THE INVENTION

Optical components of the above kinds are in general made by moulding in a plastics material, such as a thermoplastic, for example polymethylmetacrylate (PMMA) in a mould. The mould may consist of several parts, this being determined by the complexity of the form of the optical component to be made.

Reference is here made to FIG. 1 of the accompanying drawings, showing part of a known type of mould for making optical components with discontinuous surfaces. Such a mould includes laminar inserts, such as those indicated in FIG. 1 at 10, 20, 30 and 40. These consist of thin plates or shims which are machined to a very high degree of accuracy, this accuracy being also required by the form of the component to be moulded. It is determined by the surfaces 11, 21, 31 of the respective inserts, which form in the mould cavity itself the working surfaces of the optical component. A similar degree of accuracy is also required by the faces 12, 13, 22, 23, 32, 33, 42 and 43 of the inserts which are arranged to come into mutual contact and to form neutral surfaces of the optical component. Each of these thin plates corresponds to one of the discontinuities in the optical component to be moulded.

By convention, in the present description, a surface which plays any part in the forming of a light beam, and through which light rays emitted by a light source pass, will be called a working surface. Similarly, a surface which has no effect on the formation of a light beam, and through which no light ray passes, will be referred to as a neutral surface.

The insert plates are machined, and are then assembled together and held together so as to form the walls of the required mould, complementary to the surfaces of the optical component to be made. Their assembly also calls for high precision, if it is required that the moulded component shall have the required optical qualities. As a result, a mould of this kind is relatively difficult to make, because of the high accuracy required in making the insert plates and the accuracy with which these plates must be adjusted among themselves, and also because of the requirements for generally holding the mould together.

DISCUSSION OF THE INVENTION

The present invention exists in the above context. An object of the invention is to propose a method of making optical components according to which the mould is easier to make and to maintain, is less troublesome, and in which the optical components moulded in the mould still have the required optical qualities.

According to the invention in a first aspect, a method of making an optical component having working surfaces separated by neutral surfaces which define discontinuities between the working surfaces, the working surfaces and the neutral surfaces defining between them acute angles alternately with obtuse angles, wherein the method includes the steps of:

forming, in a mould, surfaces complementary to the working and neutral surfaces of the optical component; and moulding the optical component on the said surfaces of the mould, is characterised in that the step of forming the said complementary surfaces of the mould is effected by continuous cutting out of a block of material using a cutting tool.

The method preferably further includes the step of forming a hollow depression in a first surface of the mould complementary to a neutral surface of the optical component, the said depression being in the vicinity of a second surface of the mould complementary to a working surface of the component, the said first and second surfaces of the mould defining an obtuse angle between them.

The said depression preferably has a depth approximately equal to the diameter of the said tool.

Preferably, the step of continuous cutting is obtained by electro-erosion.

Preferably, the tool used in the step of continuous cutting is a laser beam.

Preferably, the said material of the mould is steel or brass.

According to the invention in a second aspect, a mould for an optical component, the optical component having working surfaces separated by neutral surfaces defining discontinuities between the working surfaces, the working surfaces and the neutral surfaces of the optical component defining between them acute angles alternately with obtuse angles, wherein the mould includes surfaces complementary to the working and neutral surfaces of the optical component, is characterised in that the mould includes a depression defined in a first surface of the mould complementary to a neutral surface of the component, the depression being in the vicinity of a second surface of the mould complementary to a working surface of the component, the said first and second surfaces of the mould defining an obtuse angle between them.

According to the invention in a third aspect, an optical component having working surfaces separated by neutral surfaces constituting discontinuities between the working surfaces, the working surfaces and the neutral surfaces defining between them acute angles alternately with obtuse angles, is characterised in that the neutral surfaces include a nose portion at their end, forming an acute angle with a working surface.

Preferably, the optical component is made of polymethylmetacrylate.

Further features, objects and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
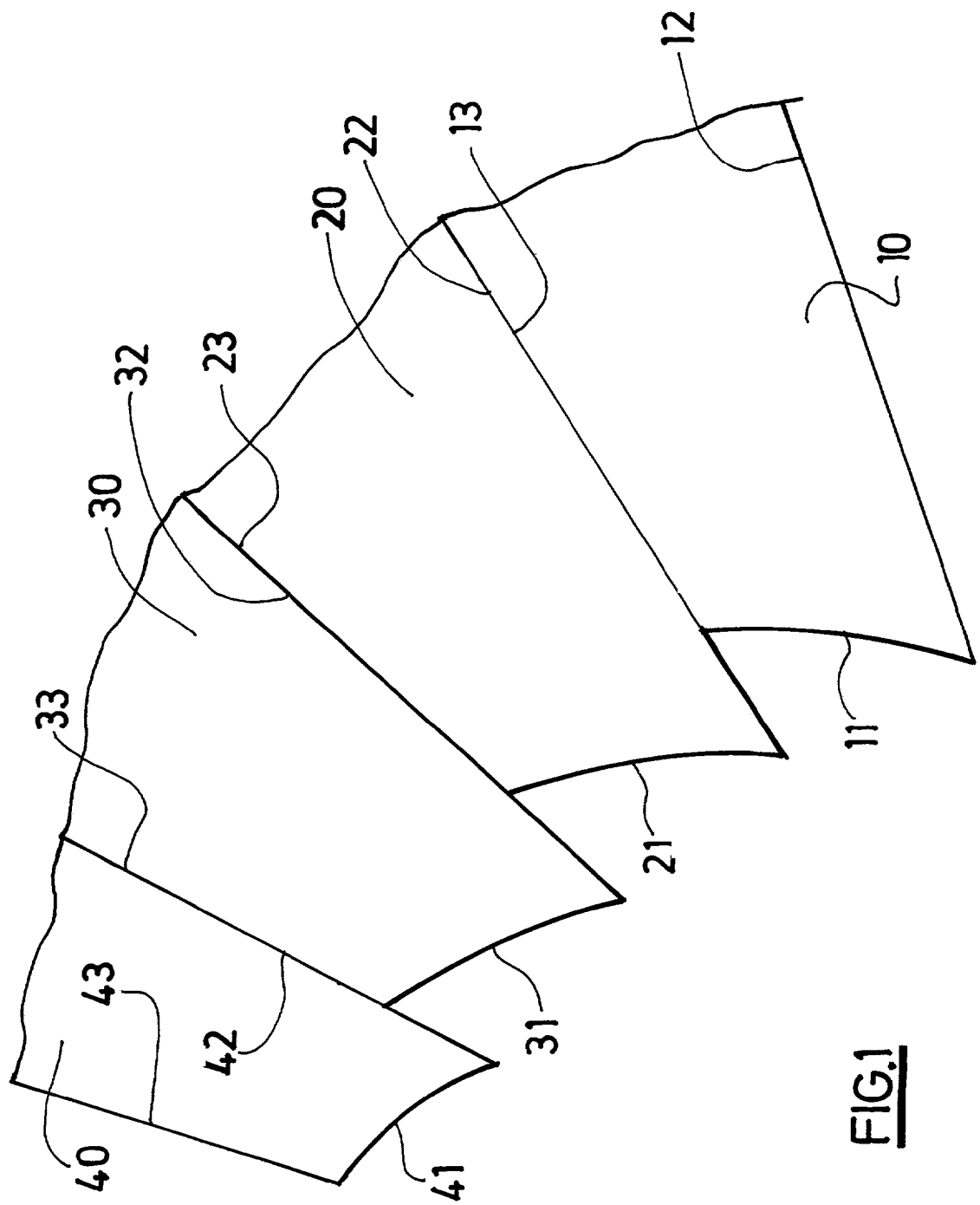
FIG. 1, already described above, shows part of a mould for making optical components in the prior art.
Figure 2:
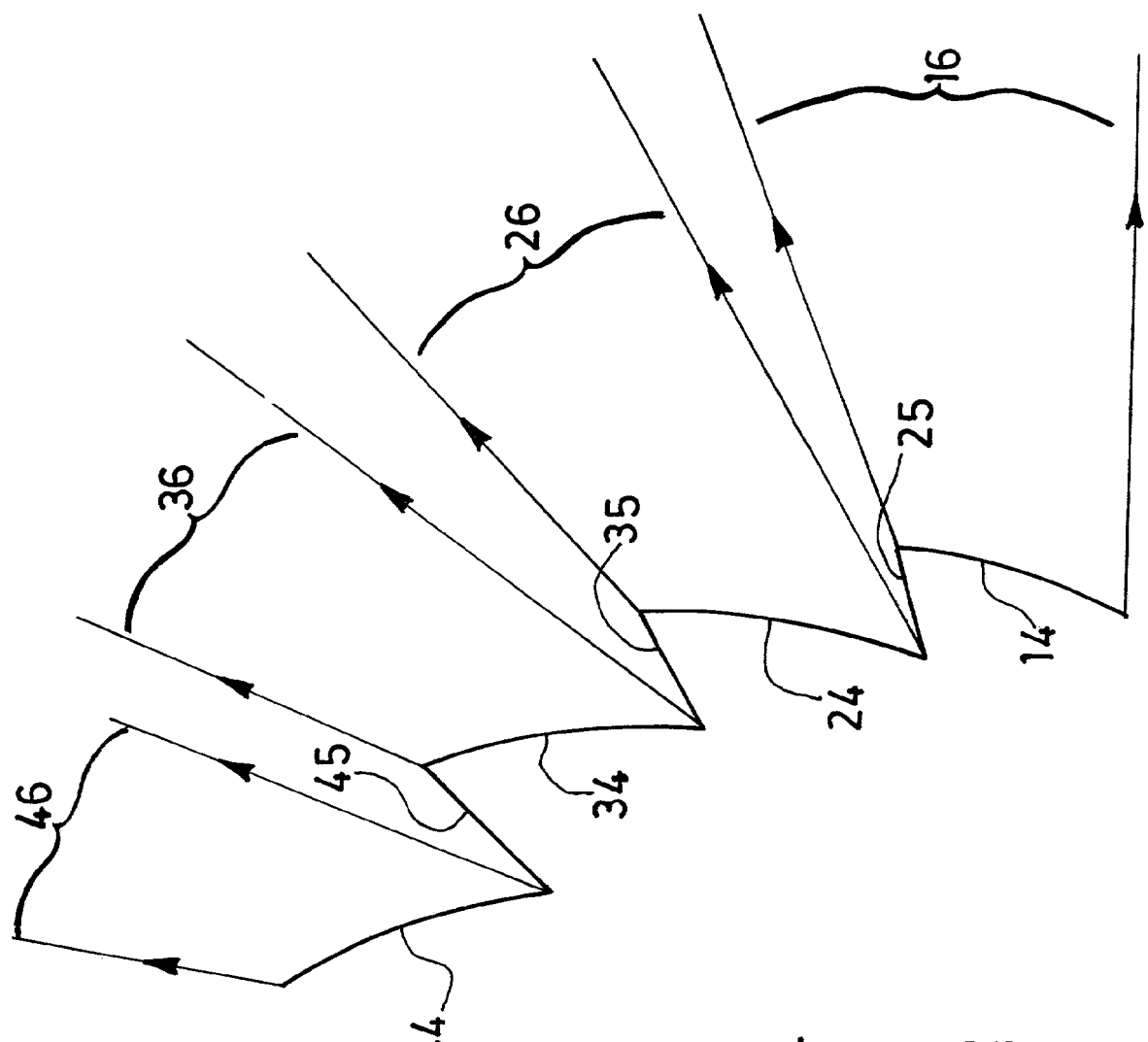
FIG. 2 shows, in partial cross section, an optical component made with the mould shown in FIG. 1.

Reference is here first made to FIG. 2, in which the optical component C, made using the mould already described above with reference to FIG. 1, is shown together with the light beams which are produced by this component when in operation. It can be seen that the optical component C has working surfaces 14, 24, 34, 44 which are complementary to the faces 11, 21, 31 and 41 respectively of the insert plates or shims 10, 20, 30 and 40. The component also has neutral surfaces 25, 35 and 45 which are formed by the faces 22, 32 and 42 of the insert plates 20, 30 and 40 respectively. In operation, the light rays emitted from a light source (not shown) pass through the working surfaces 14, 24, 34 and 44 of the optical component so as to form beams 16, 26, 36 and 46 respectively. The neutral surfaces 25, 35 and 45 do not participate in the formation of these beams. The working surfaces are separated from each other by the neutral surfaces, which thereby constitute discontinuities between the working surfaces 14, 24, 34 and 44. Accordingly it will be understood that it is unnecessary to employ any great precision in the moulding of the neutral surfaces 25, 35 and 45 because they have no effect on the optical performance of the final component.

In accordance with the present invention, the surfaces of the mould which are complementary to the neutral surfaces 25, 35 and 45 are used in such a way as to facilitate machining of the mould surfaces which are complementary to the working surfaces 14, 24, 34 and 44 of the optical component.

Figure 3:
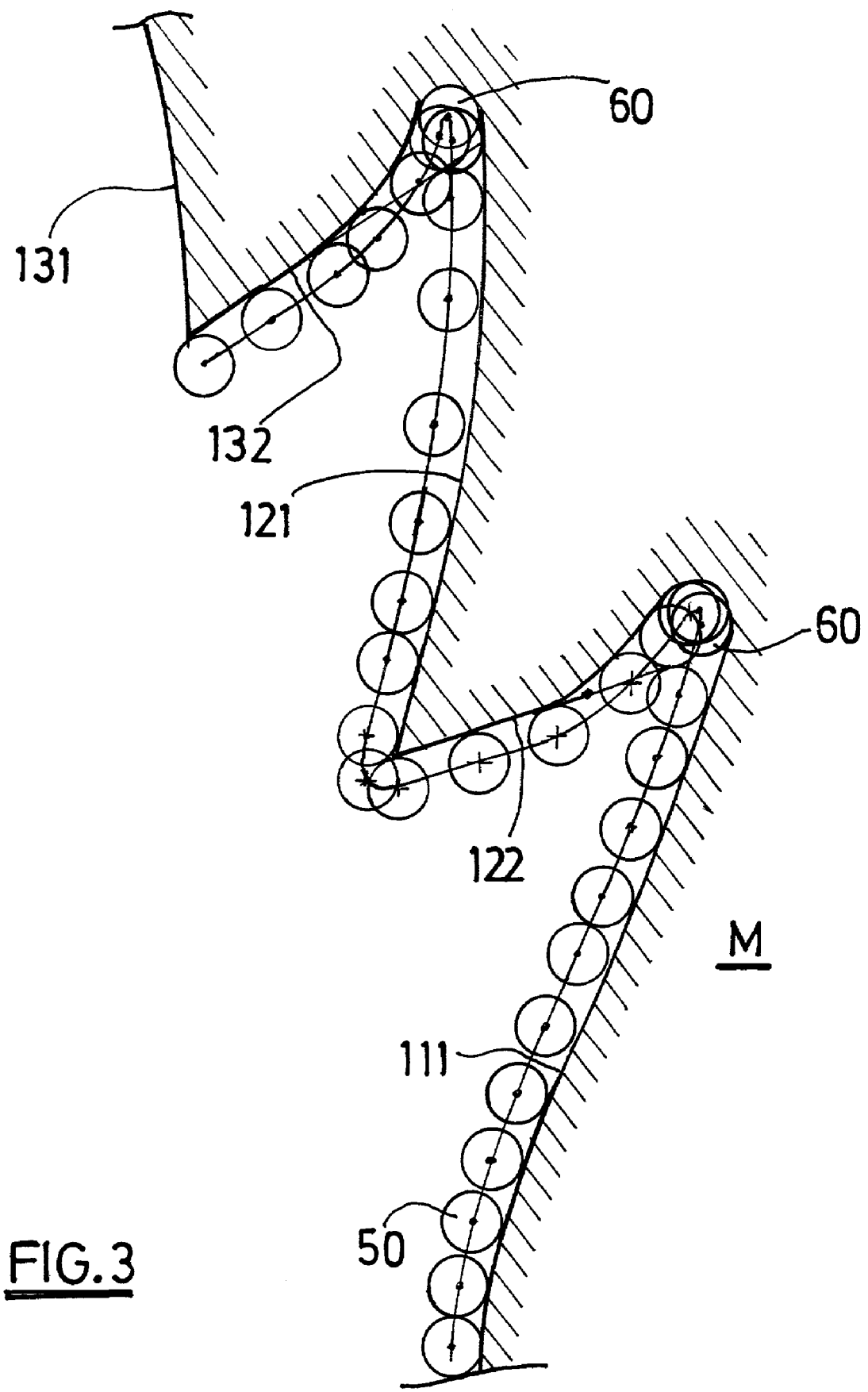
FIG. 3 illustrates steps in the process for making the surfaces of the mould in accordance with the present invention.

Reference is therefore now made to FIG. 3, which illustrates the method of forming the surfaces of the mould. FIG. 3 shows part of a block of material, for example steel or brass, together with a cutting tool 50 which defines the contour of this block of material. The tool 50 is shown in a large number of successive positions in the cross section in FIG. 3. FIG. 3 only shows the portion M of the block of material which will form the final mould. The rest of the block is omitted in the interests of clarity.

The cutting tool 50 may be in the form of a wire, for example a tungsten wire stretched between two supports in order to keep it straight. The wire 50 is guided in the block of steel or brass along a curved path at right angles to the axis of the wire, while an electric current is passed through the wire so as to cut the block by electro-erosion. The wire is guided along this path with the necessary accuracy for the surfaces 111, 121, 131 of the mould to be formed by electro-erosion. These surfaces are complementary to the working surfaces of the optical component to be made in the mould. Similarly, the wire 50 is precisely guided in order to form in the same way the mould surfaces 122 and 132 which will be complementary to the neutral surfaces of the optical component. With this method it is easy to form acute angles in the mould, for example the angles between the surfaces 122 and 121 and those between the surfaces 132 and 131.

On the other hand, the formation of obtuse angles, which are found alternately with the acute angles, in the mould, is limited by the diameter of the wire 50. Thus, it is possible to form in the mould obtuse angles defined by a rounded surface portion having a radius of curvature which is a function of the diameter of the cutting wire. For example with a wire of 0.1 mm diameter, it is possible to obtain a radius of curvature of 0.06 mm.

However, it may be noted in FIG. 2 that the obtuse angles in the mould are complementary to the acute angles of the optical component to be made in the mould, for example, between the surfaces 14 and 25, 24 and 35, and 34 and 45. Although it is important for the working surfaces 14, 24 and 34 to be formed with precision over their entire length, because they play a part in the formation of the light beams 16, 26, 36 and 46, the precision with which the neutral surfaces 25, 35 and 45 are formed has no effect on the optical behaviour of the optical component because they lie in shadow zones between two beams.

It is this latter property which is used in accordance with the present invention to form the obtuse angles in the mould. Thus, after the wire 50 has formed, for example, the surface 111 complementary to a working surface of the optical component, the cutting wire 50 forms a hollow depression 60 in the adjacent surface 122 at the junction between these two mould surfaces 111 and 122. The depression 60 is preferably shallower and corresponds to a simple in-and-out movement of the cutting tool, that is to say the wire 50 in the present case. The depth of this depression will therefore be approximately equal to the diameter of the wire 50. It is then possible, in order to cut out the surface of the mould by electro-erosion, to make use of tungsten wires having a larger diameter, and therefore wires which are stronger and easier to use. For example, wires of 0.25 mm diameter may be used.

After this cutting-out step on the surface of the mould, the mould is used to form the optical component by, for example, injection moulding.

Figure 4:
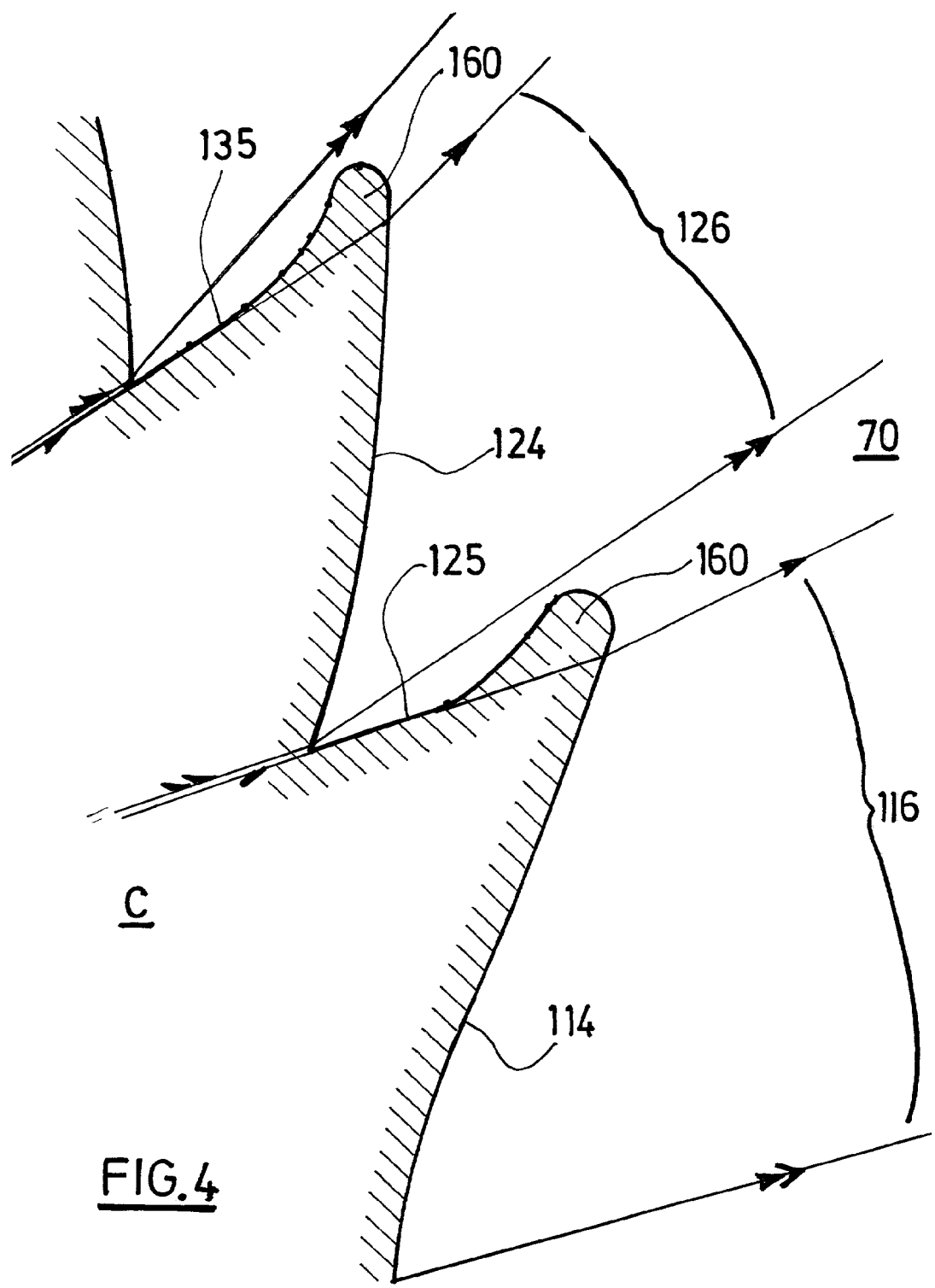
FIG. 4 shows, in partial cross section, an optical component made with the mould of the present invention.

Reference is now made to FIG. 4, showing the optical component C thereby obtained by moulding in the mould made in accordance with FIG. 3. As can be seen in FIG. 4, the working surfaces 114 and 124 of the component are separated by a neutral surface 125, which includes a nose portion 160 complementary to the depression 60 formed in the mould. The nose portion 160 lies at the end of the neutral surface, and defines an acute angle with the adjacent working surface 114.

The working surface 114 transmits the light beam 116, while the working surface 125 transmits the light beam 126, the two light beams 116 and 126 being separated from each other by a shadow zone 70. It can be seen that the nose portion 160 lies in this shadow zone 70, and does not in any way interfere with the beams 116 and 126.

In this way, a method of moulding optical components is obtained by which the mould is easier to make and to maintain, and is less troublesome than moulds in the prior art. In this connection, the mould is in the form of a single block and does not call for any precise adjustment of the attached components. The operation of cutting out the mould is effected in a single passage of the tool, regardless of the number of teeth, or of working surfaces, to be formed in the final optical component. 0.25 mm cutting wires can be used. Moulded optical components made by this method have the required optical characteristics.

The present invention is of course not limited to the embodiment described above, and a person familiar with this technical field will be able to apply numerous modifications to the method, still within the scope of the invention. For example, other types of cutting tool may be used, apart from an electro-erosion wire, for example a laser beam.

What is claimed is:

1. A method of manufacture of an optical component having a plurality of working surfaces and at least one neutral surface separating a one of said working surfaces from another one of said working surfaces and constituting a discontinuity between said working surfaces, said working and neutral surfaces defining between them acute angles alternating with obtuse angles, the method comprising:

forming a mould with a plurality of surfaces complementary to said working and neutral surfaces of said component; and moulding said component on said surfaces of the mould, wherein the mould comprises a first mould surface complementary to at least one said neutral surface of said component and a second mould surface complementary to at least one said working surface adjacent to said neutral surface, said first and second mould surfaces defining an obtuse angle between them, and wherein the method further comprises the step of forming, in said first mould surface, a hollow, depression close to a junction of said first mould surface, the hollow deppression being formed during a continuous cutting operation by a cutting tool defining a diameter, the depth of the hollow deppression being approximately equal to the diameter of said cutting tool and said second mould surface.

2. A method according to claim 1, wherein said continuous cutting step is performed by electro-erosion.

3. A method according to claim 1, wherein the mould is of a material selected from the group consisting of steel and brass.

4. A mould for making an optical component, said component having a plurality of working surfaces and at least one neutral surface disposed alternatively with said working surfaces and constituting a discontinuity between the adjacent working surfaces, said working and neutral surfaces defining between them acute angles alternately with obtuse angles, the mould defining mould surfaces complementary to said working and neutral surfaces of said component, wherein the mould comprises:

a first mould surface complementary to said neutral surface of the component; and a second mould surface close to said first mould surface and complementary to a one said working surfaces of the component, said first and second mould surfaces defining an obtuse angle between them, wherein said first mould surface is non-planar, and the mould defines, in said first mould surface, a hollow, depression close to a junction of said first mould surface and said second mould surface, the hollow depression being formed during a continuous cutting operation by a cutting tool defining a diameter, the depth of the hollow deppression being approximately equal to the diameter of said cutting tool.

5. A method according to claim 2, wherein said cutting tool comprises a tungsten wire stretched between two supports and to which electric current may be passed.

6. A method according to claim 5, wherein a diameter of the wire is 0.25 mm.

7. A mould according to claim 4, wherein the mould is made from a material selected from the group consisting of steel and brass.

8. A mould according to claim 7, wherein the mould is of a unitary, single-piece construction.

9. A mould according to claim 8, wherein a depth of said depression is approximately equal to 0.25 mm.

10. A mould according to claim 4, wherein the mould is of a unitary, singe-piece construction.

11. A mould according to claim 4, wherein a depth of said depression is approximately equal to 0.25 mm.

12. A method of manufacturing an optical component having a plurality of working surfaces and at least one neutral surface separating a one of said working surfaces from another one of said working surfaces and constituting a discontinuity between said working surfaces, said working and neutral surfaces defining between them acute angles alternating with obtuse angles, the method comprising:

forming a mould with a plurality of surfaces complementary to said working and neutral surfaces of said component, wherein the mould comprises a first mould surface complementary to at least one said neutral surface of said component and a second mould surface complementary to at least one said working surface adjacent to said neutral surface, said first and second mould surfaces defining an obtuse angle between them; and molding said component on said surfaces of the mould, wherein said step of forming said mold consists of performing a continuous cutting operation on a block of material using a cutting tool, and wherein the cutting operation comprises forming, in said first mould surface, a hollow, depression close to a junction of said first mould surface and said second mould surface, wherein said cutting tool defines a diameter,wherein the step of forming said depression comprises forming the depression to a depth approximately equal to said diameter of said cutting tool.

13. A method according to claim 12, wherein said continuous cutting step is performed by electro-erosion.

14. A method according to claim 12, wherein said block is of a material selected from the group consisting of steel and brass.

* * * * *

UNITED STATES PATENT AND TRADEMARK OFFICE
CERTIFICATE OF CORRECTION

PATENT NO. : 7,083,746 B2  Page 1 of 1
APPLICATION NO. : 10/154103
DATED : August 1, 2006
INVENTOR(S) : Jean Claude Gasquet It is certified that error appears in the above-identified patent and that said Letters Patent is hereby corrected as shown below:

<u>COLUMN 5:</u>

Line 16, after "of said first mould surface", please insert --and said second mould surface--.

Line 17, please delete "deppression" and substitute therefore --depression--.

Line 19, please delete "deppression" and substitute therefore --depression--.

Lines 20-21, after "said cutting tool", please delete "and said second mould surface".

Line 48, please delete "deppression" and substitute therefore --depression--.

<u>COLUMN 6:</u>

Line 13, please delete "singe-piece" and substitute therefore --single-piece--.

Signed and Sealed this

Twenty-fourth Day of October, 2006

JON W. DUDAS
*Director of the United States Patent and Trademark Office*